United States Patent [19]

Sakai et al.

[11] Patent Number: 5,494,737
[45] Date of Patent: Feb. 27, 1996

[54] CEILING MATERIAL FOR VEHICLES AND PRODUCTION PROCESS THEREOF

[75] Inventors: Hideo Sakai; Kojiro Motai; Satoru Kishi; Katsuyuki Morita; Hiroshi Tanabe, all of Kanagawa, Japan

[73] Assignee: Mitsui Toatsu Chemicals, Inc., Tokyo, Japan

[21] Appl. No.: 171,439

[22] Filed: Dec. 22, 1993

[30] Foreign Application Priority Data

Dec. 28, 1992 [JP] Japan .................................. 4-347859
Dec. 28, 1992 [JP] Japan .................................. 4-348538

[51] Int. Cl.$^6$ .............................. B32B 5/22; B28B 5/00; B60J 7/00
[52] U.S. Cl. ............................. 428/317.9; 428/312.6; 428/318.4; 428/318.6; 428/318.8; 428/319.7; 428/295; 428/71; 296/214; 264/46.5; 264/241; 264/321
[58] Field of Search ................... 428/174, 178, 428/304.4, 318.4, 318.6, 318.8, 317.9, 312.6, 319.3, 318.3, 319.7, 245, 311.1, 71, 74, 76, 212, 288, 289, 292, 295; 296/214; 264/46.5, 241, 321; 156/324, 245

[56] References Cited

U.S. PATENT DOCUMENTS

| | | | |
|---|---|---|---|
| 4,157,415 | 6/1979 | Lindenberg | 428/284 |
| 4,211,590 | 7/1980 | Steward et al. | 428/138 |
| 4,256,797 | 3/1981 | Stamper et al. | 428/215 |
| 4,330,584 | 5/1982 | Doerer | 428/91 |
| 4,508,774 | 4/1985 | Grabhoefer et al. | 428/220 |
| 4,543,289 | 9/1985 | Park | 428/304.4 |
| 4,621,013 | 11/1986 | Holtrop et al. | 428/245 |
| 4,698,258 | 10/1987 | Harkins | 428/285 |
| 4,734,312 | 9/1988 | Sugiyama | 428/157 |
| 4,871,612 | 10/1989 | Okina et al. | 428/269 |
| 5,139,838 | 8/1992 | Baum | 428/72 |

Primary Examiner—Donald J. Loney
Attorney, Agent, or Firm—Burns, Doane, Swecker & Mathis

[57] ABSTRACT

A ceiling material for vehicles, said ceiling material comprises:
  a core material (11) composed of a resin foamed article;
  a protective layer (12) comprising a thermoplastic resin blended with fibers in a range of not less than 40% and not more than 80% in volume content;
  said protective layer (12) being provided on at least one surface of the core material (11);
  and a thin sheet-shaped surface material (14) provided on the surface of the protective layer (12).

A process of producing ceiling materials for vehicles, which comprises the steps of:
  a material sheet of a protective layer comprising a thermoplastic resin blended with fibers in a range of not less than 40% and not more than 80% in volume content being heated to not less than a glass transition point of the thermoplastic resin;
  said material sheet being overlaid with a core material sheet composed of a resin foamed article;
  a surface material being on the core material sheet;
  and pressuring and shaping said protective layer, said core material sheet, and said surface material which have been overlaid using a molding mold.

17 Claims, 6 Drawing Sheets

5,494,737

CEILING MATERIAL FOR VEHICLES AND PRODUCTION PROCESS THEREOF

BACKGROUND OF THE INVENTION

The present invention relates to ceiling materials including sunshades for vehicles, and their production process.

The ceiling materials for vehicles include those exclusively used for interior decoration, and those which constitute the sunshades.

In recent years, improvement in comfortableness of various vehicles represented by automobiles has become an important problem, and reduction in their fuel consumption cost and recycling of vehicle parts upon disuse of vehicles have also become important.

Thus, the interior decoration materials are also required to be of a light weight and to contribute to improvement in comfortableness, safety and economy.

In the meantime, the interior decoration material widely used in the prior art include those in which sawdusts or glass fibers are solidified with a thermosetting resin, and those in which a resin foamed article, a corrugated board or the like is used as a core material, and a surface material for dressing is glued onto the surface of the core material.

However, for example, those which include the sawdusts solidified with the thermosetting resin are heavy and inconvenient, while the corrugated board has a light weight, but it has a problem on molding, as well as it easily suffers breakage, and those which include the glass fibers or the like solidified with the thermosetting resin and those which include the resin foamed article used as the core material do not have sufficient strength and require reinforcement materials, so that they have had a disadvantage that production steps become complicated.

In addition, a cloth or resin sheet is sometimes directly affixed to the ceiling with a packing be inserted between the ceiling and the resin sheet, however, this method have such problems that a lot of human hands are required, and the quality control becomes insufficient.

In addition, the sunshade has been often used recently in order to improve comfortableness of transport vehicles, however, one having been used in the prior art is obtained by molding a thermosetting resin composite material using a high pressure press and gluing a surface material thereto, which is extremely heavy, and requires a large amount of raw materials.

In addition, it is also proposed that a core material is assembled with an aluminum alloy to which a surface material is affixed, however, this has also such problems that production steps are complicated, and the cost is expensive.

In addition, the ceiling materials for vehicles known in the prior art have been difficult to be recycled when vehicles became disused.

The present invention has been made to solve the aforesaid problems, an object of which is to provide a ceiling material for vehicles which is lighter and stronger than those in the prior art in which a small amount of raw material are sufficient to be used, the rigidity is large, products having high qualities can be supplied inexpensively in a large amount, corrosion resistance and weatherability are excellent, and recycling is possible.

SUMMARY OF THE INVENTION

The aformentioned object is achieved by a ceiling material for vehicles which is formed so that a protective layer comprising a thermoplastic resin blended with fibers in a range of not less than 40% and not more than 80% in volume content is laminated onto at least one surface of a core material composed of a resin foamed article, and a thin sheet-shaped surface material for dressing is affixed onto the surface of the protective layer.

The protective layer is provided on any one or both of the front and back faces of the core material, and the surface material is provided in the same manner.

The ceiling material for vehicles may be utilized not only as a ceiling material for interior decoration but also as a sunshade.

A polypropylene type resin is preferable as the resin for constituting the core material and the protective layer in either case, while glass fiber is recommended as the fiber to be blended into the protective layer, and it is desirable to use a prepreg in which the fibers are arranged in one direction.

The present invention will be explained in detail hereinafter with reference to drawings.

DESCRIPTION OF THE PREFERRED EMBODIMENTS

Figure 1:
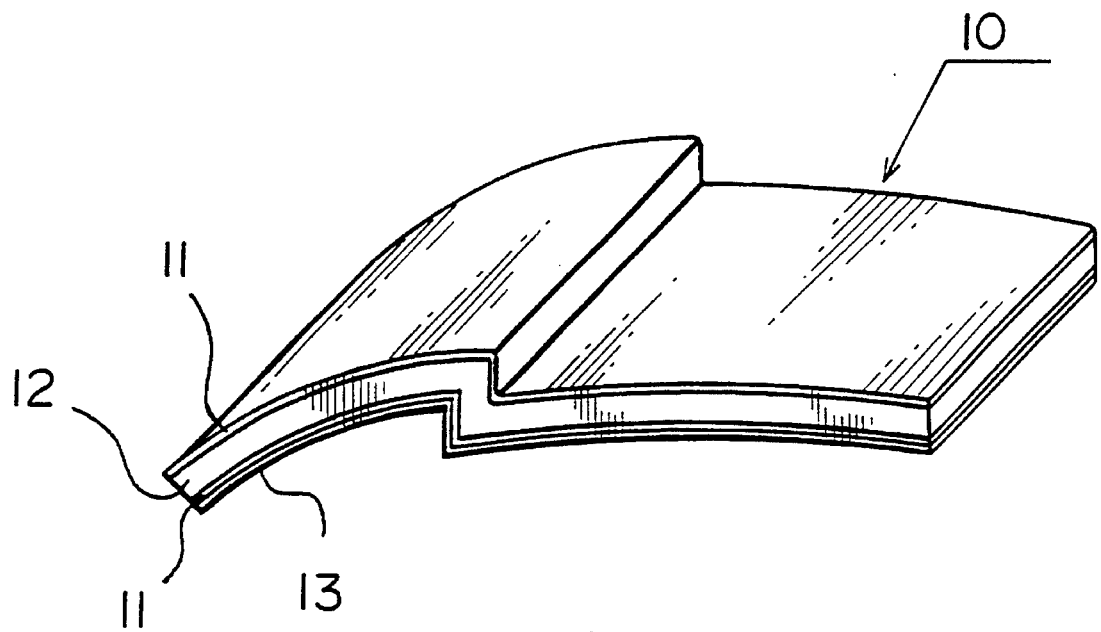
FIG. 1 and FIG. 2 are perspective view showing examples of ceiling material for vehicles according to the present invention.
Figure 2:
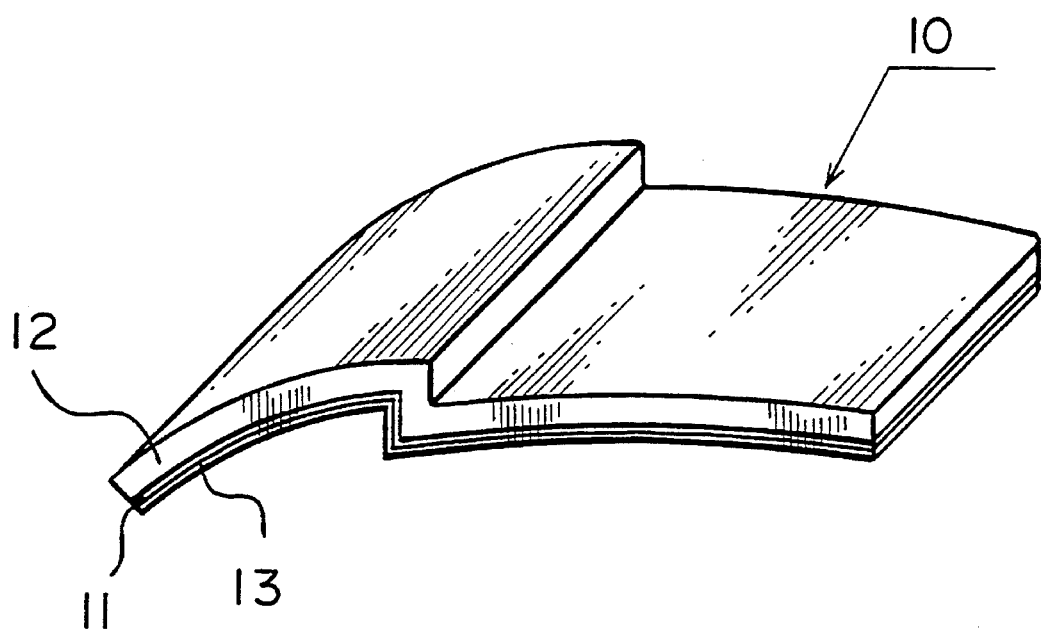
Figure 3:
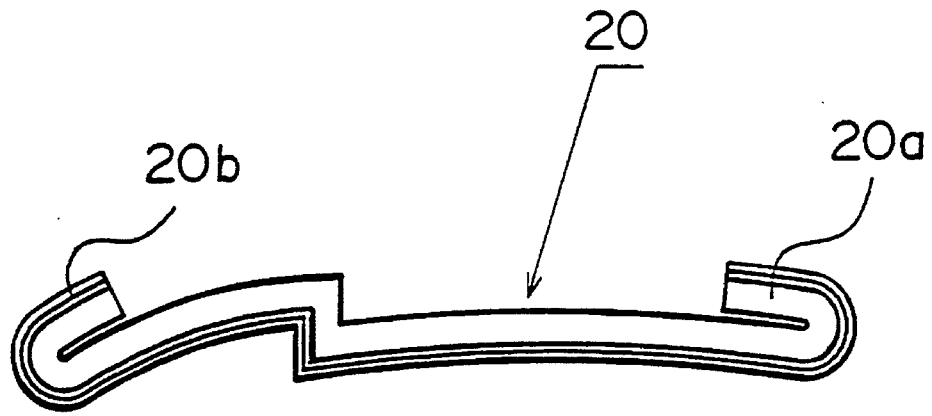
FIG. 3 is a side view showing a ceiling material for vehicles, both ends of which are folded.

A ceiling material 10 for vehicles shown in FIG. 1 or FIG. 2 is formed by laminating a core material 12 comprising a resin foamed article, a protective layer 11 and a surface material 13 for decoration, so as to make integral joining and molding. In such a state, the core material 12 and the protective layer 11 are exposed at end portions, so that an unattractive appearance is given, however, when there is such inconvenience during use, as in a ceiling material 20 shown in FIG. 3, it is recommended that end portions 20a and 20b are subjected to folding processing toward the core material side respectively and then are used.

Figure 4:
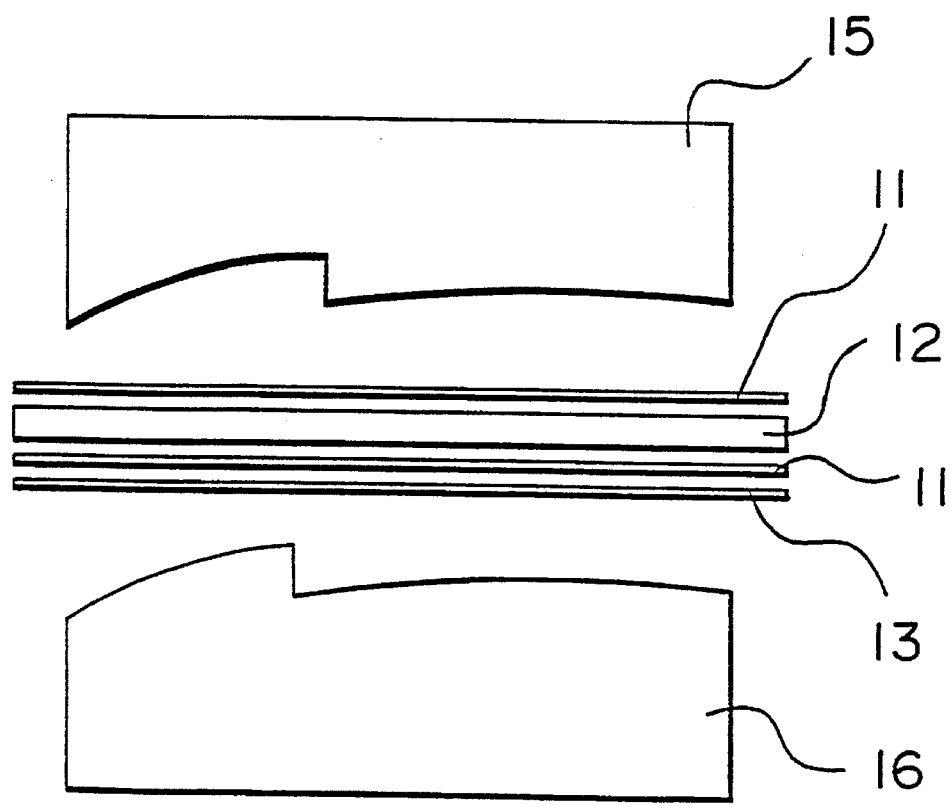
FIG. 4 and FIG. 5 are explanatory views showing a process for making of the ceiling material for vehicles according to the present invention.
Figure 5:
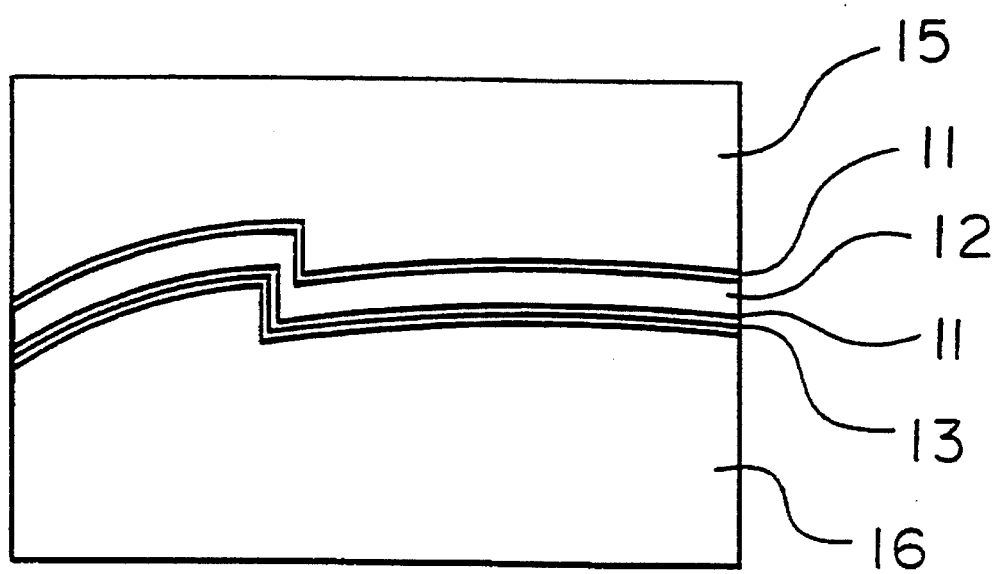

As shown in FIG. 4 and FIG. 5, the ceiling material 10 shown in FIG. 1 is produced by overlaying and inserting the core material 12, the protective layer 11 and the surface material 13 between molding molds 15 and 16, and performing heating and pressurizing.

More specifically the material sheet of the protective layer 11 composed of fiber and a thermoplastic resin is heated to not less than a melting temperature of the thermoplastic resin, and is overlaid onto the core material sheet 12 composed of a resin foamed article at a high temperature, and the surface material 13 is further overlaid thereon, resulting multilayers 11, 12, 13 being interposed between the press molding molds 15, 16, followed by pressurizing, shaping and if necessary applying a treatment to circumferential edge portions, thereby a product can be obtained.

At this time, when the protective layer sheet at a high temperature contacts with the surface of the core material composed of the resin foamed article, the surface of the core material is melted, and its melted portion serves as an adhesive to integrally join the core material 12 and the surface material 13 to the protective layer 12.

The thermoplastic resin heated to not less than the melting temperature generally becomes to be in a state capable of melting and fluidizing, however, in the case of a composite material containing fibers by not less than 40% in volume ratio, the resin is held in the lattice of fibers in a state incapable of free fluidization, and thus when a pressure for shaping is applied in such a state, the whole shape is determined in a stable form using the fibers as a framework, so that a molded article having high accuracy is obtained.

Figure 6:
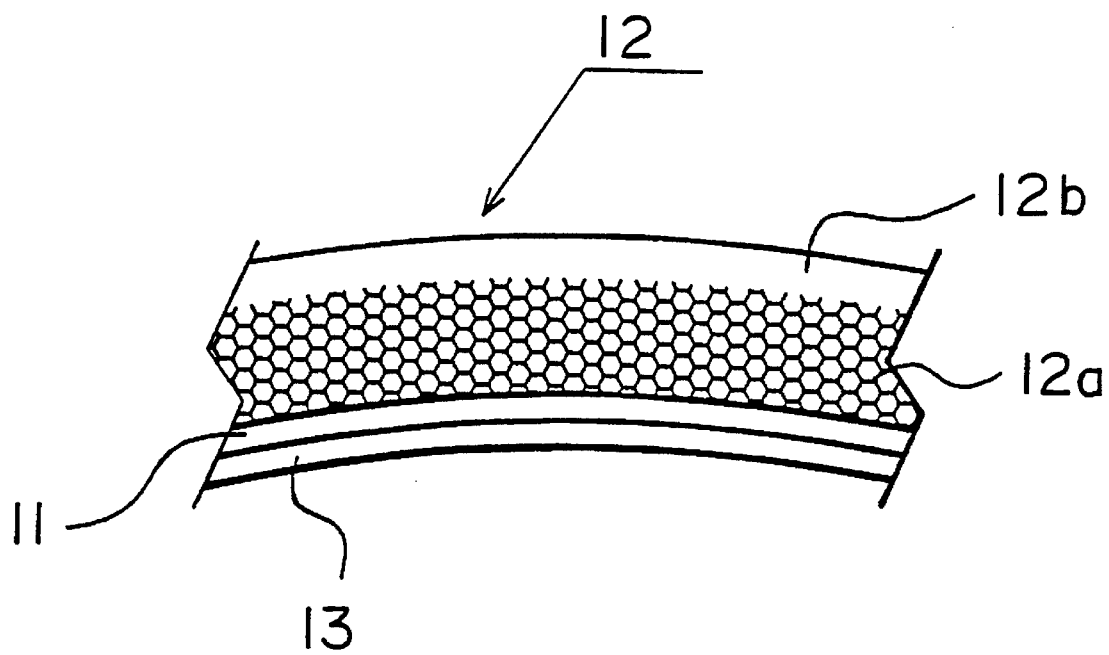
FIG. 6 shows one example of the present invention, which is a partially enlarged cross-sectional view showing constitution of a ceiling material for vehicles formed by using a core material having a non-foamed resin layer at one face.
Figure 7:
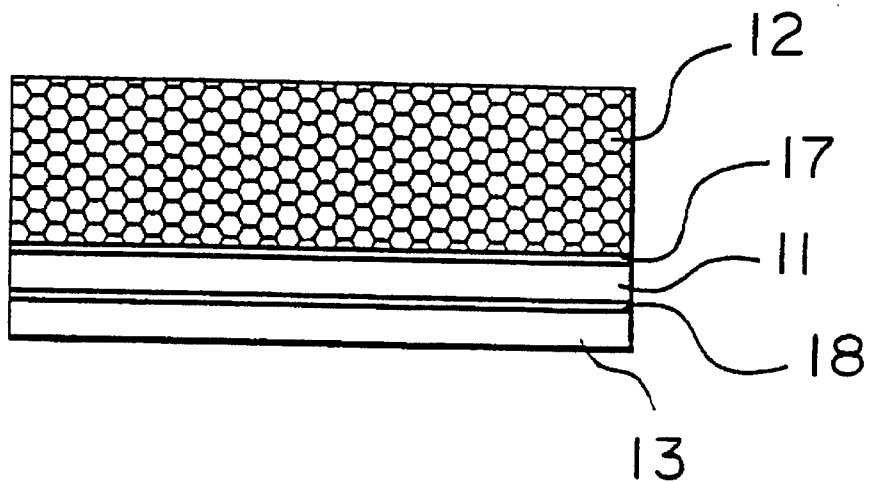
FIG. 7 is a partially enlarged cross-sectional view showing constitution of a ceiling material for vehicles formed by using a core material having no non-foamed resin layer as another example of the present invention.
Figure 8:
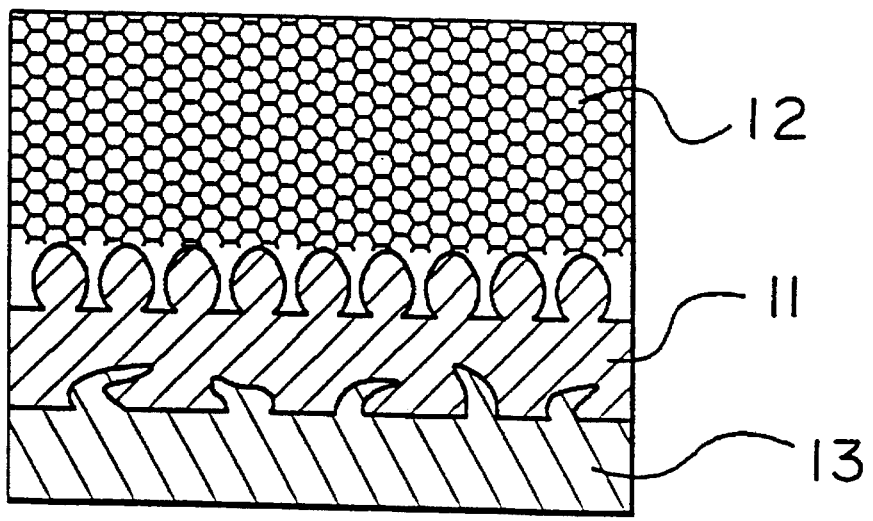
FIG. 8 is a partially enlarged cross-sectional view showing detailed constitution of the ceiling material for vehicles shown in FIG. 7.

Detailed constitution of the ceiling material 10 for vehicles is shown in FIG. 6 to FIG. 8.

A ceiling material shown in FIG. 6 has a core material 12 which is composed of a foamed portion 12a and a non-foamed portion 12b. By constituting in such a manner, the ceiling material has its smooth back face, which becomes strong having wear resistance and rigidity.

A ceiling material shown in FIG. 7 includes the core material 12 which is entirely composed of a foamed article. This has a weight lighter than that of one shown in FIG. 6, which is suitable for use at places there is nothing contacting with the back face.

When the materials of the core material 12 and the surface material 13 are those which are melted by heat of the protective layer 11, parts of them are also melted to be integrated with the resin of the protective layer 11, and as shown in FIG. 7, uniform adhesive layers 17 and 18 are formed.

On the other hand, when the materials of the core material 12 and the surface material 13 are those which are not melted by heat, as shown in FIG. 8, the both are strongly joined to the protective layer 11 owing to an anchor effect by means of irregularity on their surfaces.

Next, materials and the like for each of constitution elements will be explained.

There is no special limitation for the thermoplastic resins for constituting the core material 12, the surface material 13 and the protective layer 11, and for example, polystyrene, polyvinyl chloride, high density polyethylene, polypropylene, polycarbonate, polybutylene terephthalate, polyethylene terephthalate, polyethersulfone, polysulfone, polyetherimide (trade mark: ULTEM), polyether etherketone, polyphenylene sulfide and the like can be used, however, from viewpoints of strength, wear resistance, price, easiness of recycling when they become a waste matter and the like, polypropylene type resins are recommended as the most desirable resin.

It is desirable that the material resins of the core material 12, the surface material 13 and the protective layer 11 are a resin of the same type.

In addition, the expansion ratio of the core material 12 is not less than 5-fold and not more than 60-fold, desirably not less than 10-fold and not more than 50-fold.

Even if a material having an expansion ratio of less than 5-fold is used, the amount of use of the raw materials increases, products merely become heavy, and any advantage cannot be obtained, while if it is more than 60-fold, rigidity and wear resistance necessary for products are not obtained.

In the meantime, the fiber to be blended into the material of the protective layer 11 can be exemplified by synthetic resin fibers such as aramid fiber (registered trade mark "Kevler" and the like) and the like, natural organic fibers, metallic fibers such as titanium, boron, stainless steel and the like, and inorganic fibers such as glass, carbon, silicon carbide and the like. However, there is necessarily no limitation thereto, and any one which has sufficient strength and can be obtained inexpensively in a large amount may be utilized.

Furthermore, in addition to these fibers, wire mesh or the like is sometimes used.

With respect to the blending ratio of the fibers, if it becomes less than 40% in volume, it becomes difficult to shape the laminated article 10 because the fluidity of the resin is increased at a high temperature, as well as necessary rigidity and wear resistance can not be obtained, and breakage is often caused during operation, while on the contrary, if it exceeds 80%, the toughness decreases, as well as the molding processing becomes difficult, so that the blending ratio of the fibers should be not less than 40% and not more than 80%, and desirably not less than 45% and not more than 60%.

In addition, it is recommended that the fiber is made aligned in a constant direction, that is in a direction in which bending stress will act during use.

In addition, the fiber-blended layer may be a composite article including a layer in which the fibers are arranged in the lateral width direction and a layer in which the fibers are arranged in the longitudinal direction, and it is also recommended to use the fibers formed into a plain weave.

A prepreg is preferable as a material for the protective layer 11.

In addition, the material for constituting the surface material 14 may be exemplified by foamed or non-foamed sheets of polypropylene, polystyrene and the like, thermoplastic resin products such as polyvinyl chloride sheets and the like, as well as those with fibers protruding at the surface e.g. woven cloth and nonwoven cloth comprising various fibers and the like.

Next, sunshades shown in FIG. 9 to FIG. 11 will be explained.

The sunshade is a ceiling material which also serves as an a flap door shading attached to an opening and closing window provided at a ceiling of a vehicle.

Therefore, the sunshade is different from a mere ceiling material used exclusively for interior decoration, both of inner and outer faces of which must be smooth and beautiful, while the wear resistance is also required for the both faces, and the bending strength, tensile strength, shock resistance, weatherability and rigidity superior to those of the interior decoration material are required.

Thus, protective layers are required at both front and back face of the core material, and the protective layers are joined to the both faces of the core material, thereby a member is obtained which is stronger than the ceiling materials as explained above.

Figure 9:
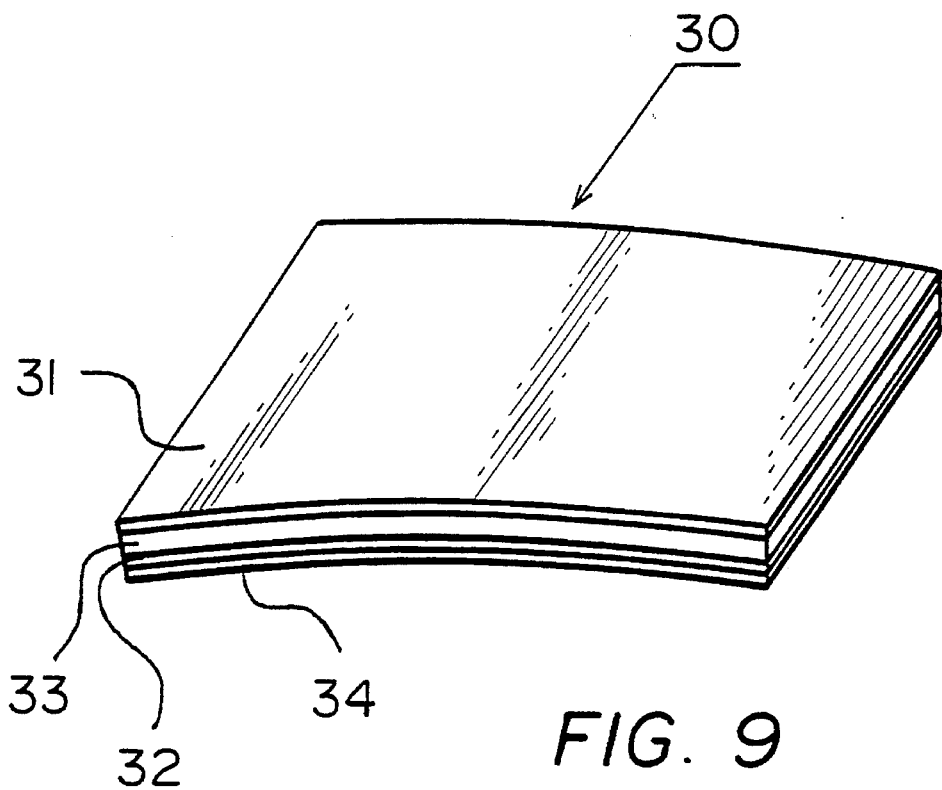
FIG. 9 is a perspective view showing constitution of a sunshade having a surface material at one face.

Namely, a sunshade 30 shown in FIG. 9 is formed such that protective layers 31, 32 are provided at both front and back faces of a core material 33, and a surface material 34 is affixed to the surface of one protective layer 32.

Figure 10:
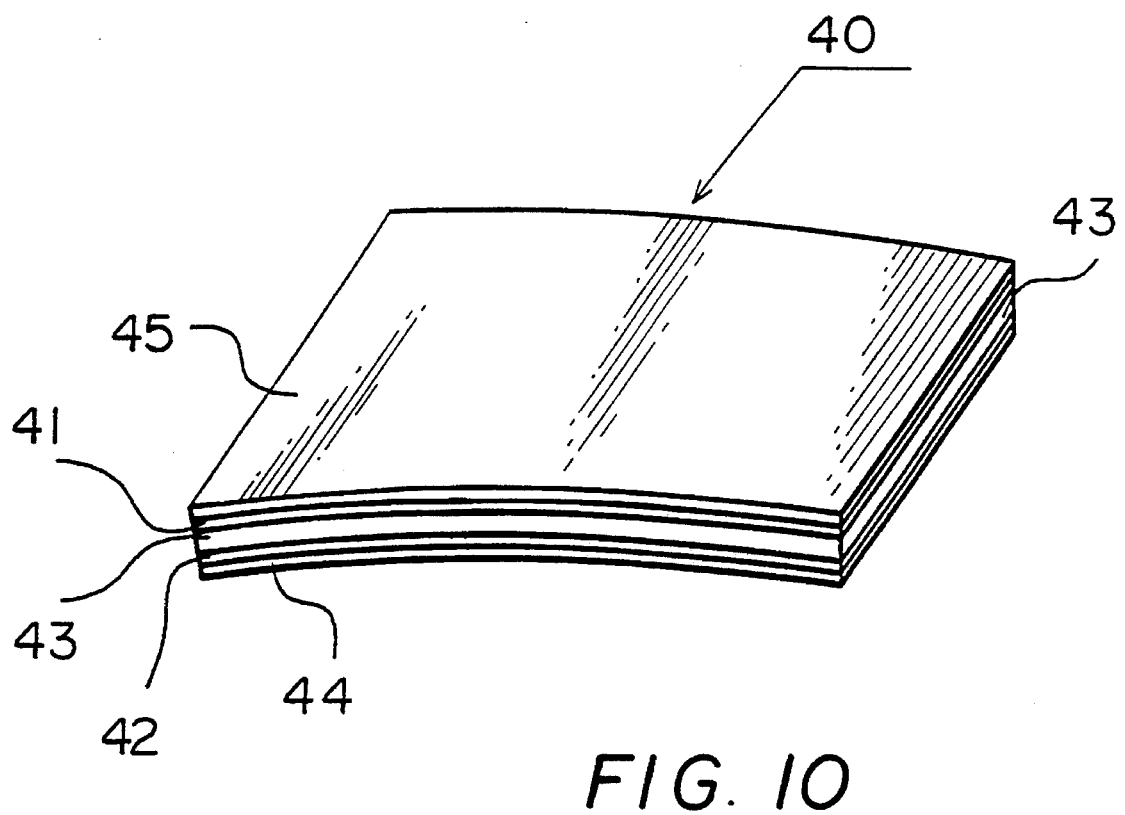
FIG. 10 is a perspective view showing constitution of a sunshade having surface materials at both faces.

In addition, one shown in FIG. 10 is a sunshade 40 having a five-layered structure which is formed in a manner that protective layers 41, 42 are provided at both front and back faces of a core material 43, and surface materials 44, 45 are affixed to surfaces of the protective layers 41, 42.

These core materials, protective layers and surface materials are exactly the same as those of the above-mentioned ceiling materials, and their production process is also the same.

Figure 11:
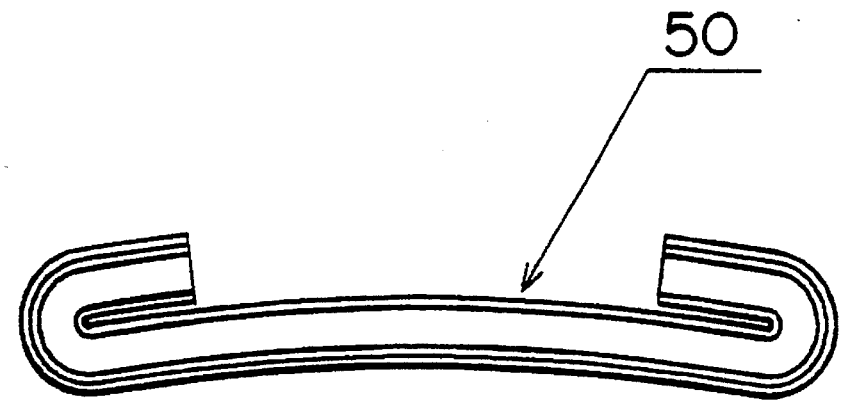
FIG. 11 is a side view showing a sunshade in which both ends are folded and FIG. 12 is a perspective view showing a test device for testing of strength.

And these sunshades 30, 40 are sometimes used as a sunshade 50 shown in FIG. 11 by folding their both end portions or edge sides of the entire circumference.

These sunshades are light in weight and strong, and have the both faces which are beautiful and smooth, being excellent in weatherability, corrosion resistance and wear resistance, having high accuracy as parts and hence being easy to be attached, being capable of lightly opening and closing for a long period.

In addition, these sunshades can be made using small amounts of raw materials and are economic, which can be supplied inexpensively in a large amount with high qualities, and when vehicles to which these are attached are subjected to disuse of vehicles, recycling of their resin materials can be easily recycled.

The ceiling material for vehicles according to the present invention is lighter and easier to handle and requires only a small amount of raw materials to be used as compared with those in the prior art because the core material is formed by the resin foamed article. Further, it has extremely high rigidity and shock resistance as a whole, and is excellent in corrosion resistance and weatherability, can be supplied inexpensively in a large amount and is capable of being recycled because the core material has high compressive strength, and is provided with the protective layer composed of the fiber-reinforced synthetic resins having extremely large rigidity and tensile resistance on at least one face thereof, so that when the present invention is carried out, it is useful for improvement in fuel consumption of vehicles and improvement in safety and economy.

The present invention will be further explained in detail in accordance with concrete examples.

[Production of prepreg]

A prepreg having a width of 200 mm was produced by means of a method disclosed in an official gazette of Japanese Patent Publication No. 02-042168. The surface of glass fibers having a thickness of 13μ was treated with γ-methacryloxy-propyltrimethoxysilane, 1800 individuals of which were bundled to provide a yarn having no twisting, 80 pieces of the yarn were aligned in one direction with stretching by uniform tensile force, a resin was twined around the yarn and impregnated into the yarn while stroking with a hot roll to produce the prepreg.

The prepreg thus produced has 45% of resin content rate in volume and a thickness of 0.23 mm.

The prepreg thus produced is excellent in the close contact property between the fiber and the thermoplastic resin, in which the fiber content can be also changed from 30 to 90% by weight depending on demands, and the thickness of 0.1 to 1.0 mm may be achieved for production. However, it is desirable to use in a range in which the glass content is 40 to 80% by volume, and the thickness is 0.1 to 0.6 mm. If the volume content of the fiber is not more than 40% by volume, the strength is low because the amount of fibers is small, while if it is not less than 80% by weight, the amount of resin is small with respect to the fiber, the close contact property between the fiber and the resin lowers, and the strength decreases, which is not preferable.

A sheet molding compound (SMC) in which unsaturated polyester was combined with glass fiber was produced in such a manner that a resin solution, in which 100 parts by weight of unsaturated polyester, Ester ML 1805 made by Mitsui Toatsu Chemicals, Inc. was added with 1 part by weight of t-butylperoxybenzoate, 130 parts by weight of calcium carbonate, 2 parts by weight of zinc stearate and 1 part by weight of magnesium oxide, was impregnated into glass fiber roving cut into 25 mm by means of an ordinary method using a sheet molding compound production machine, which was adjusted to have a glass fiber content of 30% by weight, and aged for 24 hours in an atmosphere at 40° C.

In FIG. 1 are shown constitutions of prepregs and SMC produced to use in Examples and Comparative Examples of the present invention.

TABLE 1

| Symbol of prepreg | Type of reinforced fiber | Type of resin | Fiber content volume % | Sheet thickness mm |
|---|---|---|---|---|
| A | unidirectional glass fiber | polypropylene | 45 | 0.09 |
| B | unidirectional glass fiber | polypropylene | 48 | 0.22 |
| C | unidirectional glass fiber | polystyrene | 45 | 0.09 |
| D | unidirectional glass fiber | polystyrene | 48 | 0.23 |
| SMC | random orientation glass fiber | unsaturated polyester | 18 | 3.00 |

EXAMPLE 1

Using the prepreg A as having the fiber direction of 0 degree, two sets of laminated articles were prepared in which two layers were overlaid in such a manner that the first layer forms 0 degree and the second layer forms 90 degrees. The laminated article had a size of a square of 1000 mm. Nonwoven cloth made of tricot as a surface material, and polypropylene of expansion ratio of 30 having a thickness of 6 mm as a core material were prepared as having the same size as that of the laminated article.

The two set of prepregs were heated for 2 minutes in a furnace using far infrared radiation at 220° C. as a heating source, and the polypropylene resin of the prepregs was melted.

Next, as shown in FIG. 4, the surface material 13 made of tricot was inserted into molds heated to 60° C., then heated one set of the prepregs 11 were placed on the surface material 13 so as to allow the layer of 0 degree to contact with the surface material, the foamed article of 6 mm heated to 80° C. as the core material 12 was immediately placed on the prepreg laminated article, then another set of the prepreg laminated articles were placed on the foamed article so as to allow the layer of 90 degrees to contact with the foamed article, the molds 15, 16 were closed, and pressurized for 1 minute at a low pressure of 0.5 kg/cm$^2$ per surface area of molded article, and a ceiling material was molded. The operation to introduce the materials into the molds was performed within 30 seconds in which the prepregs were in a melting state. The thickness and the weight of this plate were measured.

Figure 12:
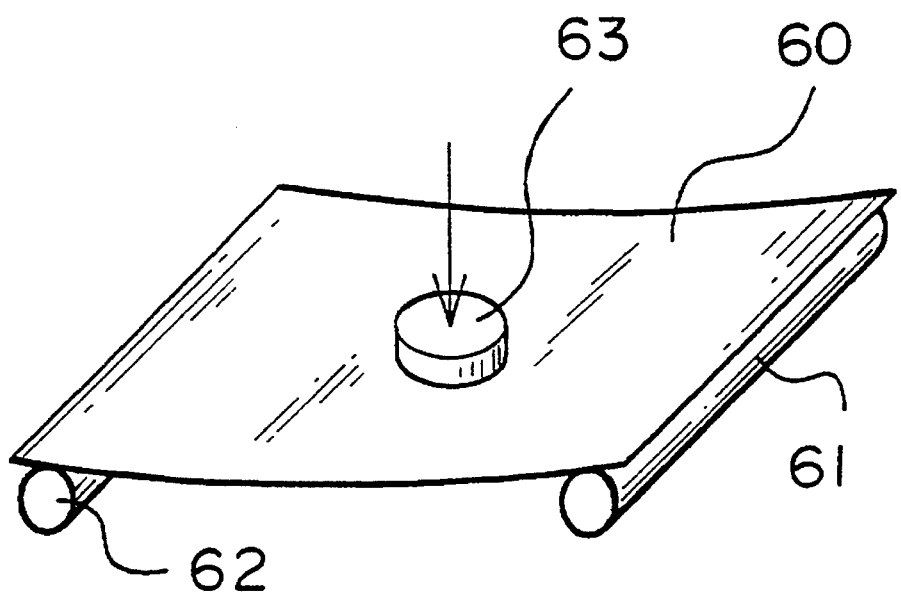

Next, a plate having a length of 600 mm and a width of 400 mm was cut out from a central portion of this ceiling material, which was supported using a span of 500 mm as shown in FIG. 12, and a load of 20 kg was applied to a central portion through one load carrying plate made of wood having a diameter of 160 mm, and the deflection amount at the plate central portion was measured. In addition, a strip-shaped test piece having a length of 200 mm and a width of 20 mm was cut out, and the thermal expansion coefficient was measured between 20° C. and 150° C. Measurement results are shown in Table 2.

EXAMPLE 2

Using the prepreg C, a ceiling material was produced in the same manner as Example 1 except that polystyrene having an expansion ratio of 30-fold was used, and the thickness, weight, deflection amount and thermal expansion coefficient were measured. Measurement results are shown in Table 2.

EXAMPLE 3

Using the prepreg B, a sunshade shown in FIG. 9 was produced in the same manner as Example 1 except that polypropylene of 15-fold foaming having a thickness of 10 mm was used. A test plate was cut out in the same manner as Example 1, and the thickness, weight and deflection amount were measured. Measurement results are shown in Table 2.

EXAMPLE 4

Using the prepreg D, a sunshade shown in FIG. 9 was produced in the same manner as Example 1 except that polystyrene of 15-fold foaming having a thickness of 10 mm was used. A test plate was cut out in the same manner as Example 1, and the thickness, weight and deflection amount were measured. Measurement results are shown in Table 2.

COMPARATIVE EXAMPLE 1

A conventional type ceiling material was produced in such a manner that a material in which 100 parts by weight of fiber dust was added with 30 parts by weight of a phenol resin was heated and pressurized at 200° C. to obtain a plate material to which an epoxy type resin adhesive was applied and nonwoven cloth made of tricot was affixed as a surface material. A test plate was produced in the same manner as Example 1, and the thickness, weight, deflection amount and thermal expansion coefficient were measured. Measurement results are shown in Table 2.

COMPARATIVE EXAMPLE 2

A conventional type ceiling material was produced such that an epoxy type resin adhesive was applied onto a corrugated board, and nonwoven cloth made of tricot was affixed as a surface material. A test plate was produced in the same manner as Example 1, and the thickness, weight, deflection amount and thermal expansion coefficient were measured. Measurement results are shown in Table 2.

COMPARATIVE EXAMPLE 3

A conventional type ceiling material was produced such that a water emulsion type adhesive was applied onto a 30-fold foaming maleic acid modified polystyrene foamed article having a thickness of 10 mm, and nonwoven cloth made of tricot was affixed as a surface material. A test plate was produced in the same manner as Example 1, and the thickness, weight, deflection amount and thermal expansion coefficient were measured. Measurement results are shown in Table 2.

COMPARATIVE EXAMPLE 4

A sunshade substrate was molded in such a manner that SMC was introduced into molds heated to 150° C., and pressurized for 5 minutes under a pressure of 100 kg/cm$^2$.

A conventional type ceiling material was produced in such a manner that an epoxy type resin adhesive was applied onto the SMC substrate, and nonwoven cloth made of tricot was affixed as a surface material. A test plate was produced in the same manner as Example 1, and the thickness, weight and deflection amount were measured. Measurement results are shown in Table 2.

TABLE 2

| | Thickness mm | Weight kg/cm$^2$ | Deflection amount mm | Linear expansion coefficient 10$^{-6}$/degree |
| --- | --- | --- | --- | --- |
| Example 1 | 5 | 630 | 10 | 5 |
| Example 2 | 5 | 640 | 8 | 5 |
| Example 3 | 9 | 1250 | 5 | — |
| Example 4 | 9 | 1280 | 3.5 | — |
| Comparative Example 1 | 5 | 2000 | 15 | 10 |
| Comparative Example 2 | 5 | 1200 | 30 | 3 |
| Comparative Example 3 | 9 | 450 | 50 | 30 |
| Comparative Example 4 | 5 | 2700 | 8 | — |

Further, the above-described substrate has various applications other than the ceiling material for vehicles. For example, the substrate attached with a framework made of wood or synthetic resin can be utilized as a panel for concrete depositing. Such concrete panel is disclosed in detail in the Japanese Patent Application Hei 4-347859.

This panel is lighter than conventional wooden panels, requires less raw materials, has high rigidity, corrosion resistance, weatherability, and high quality with less expensive, and is easy to be handled at a construction site, and can be recycled.

Further, if the surface of such panel are formed with suitable concave-convex patterns, such patterns can be transferred onto the surface of the deposited concret.

What is claimed is:

1. A ceiling material for vehicles which is capable of undergoing bending or folding processing without breakage, said ceiling material consists essentially of:

a core material comprising a foamed thermoplastic resin, wherein said core material has an expansion ratio of not less than 5-fold and not more than 60-fold;

a protective layer consisting essentially of a thermoplastic resin blended with fibers in a range of not less than 40% and not more than 80% in volume content;

said protective layer being provided on at least one surface of the core material;

and a thin sheet-shaped surface material provided on at least one protective layer, such that a protective layer is between the core material and the surface material.

2. A ceiling material for vehicles according to claim 1 wherein the protective layers are provided on both front and back faces of the core material, and the surface materials are provided on each of the protective layers.

3. A ceiling material for vehicles according to claim 1 wherein the protective layers are provided on both front and back faces of the core material, and the surface material is provided on one protective layer only.

4. A ceiling material for vehicles according to claim 1 wherein the protective layer is provided on one face of the core material, and the surface material is provided on said protective layer.

5. A ceiling material for vehicles according to claim 1 wherein both of the thermoplastic resins for forming the core material and the protective layers at the front and back comprise a polypropylene resin.

6. A ceiling material for vehicles according to claim 1 wherein the fibers blended into the protective layers are glass fibers.

7. A ceiling material for vehicles according to claim 1 wherein the fibers blended into the protective layers are arranged in one direction.

8. A ceiling material for vehicles according to claim 1 wherein the protective layers are prepegs.

9. A ceiling material for vehicles according to claim 1 wherein the surface material is a sheet comprising a polypropylene resin.

10. A ceiling material for vehicles according to claim 1 wherein the surface material is subjected to emboss processing.

11. A ceiling material for vehicles according to claim 1 wherein the core material has an expansion ratio of not less than 10-fold and not more than 50-fold.

12. A ceiling material for interior decoration of a vehicle comprising a ceiling material for vehicles according to claim 1.

13. A sunshade for a vehicle comprising a ceiling material for vehicles according to claim 1.

14. A ceiling material for vehicles according to claim 1 wherein the thermoplastic resin for forming the core material and the protective layers are selected from the group consisting of polystyrene, polyvinyl chloride, high density polyethylene, polypropylene, polycarbonate, polybutylene terephthalate, polyethylene terephthalate, polyethersulfone, polysulfone, polyetheramide, polyether etherketone, and polyphenylene sulfide.

15. A ceiling material for vehicles according to claim 14 wherein the core material and the protective layer comprises the same thermoplastic resin.

16. A ceiling material for vehicles according to claim 1 wherein the core material further includes a non-foamed thermoplastic resin.

17. A process of producing ceiling materials for vehicles, which comprises the steps of:

heating a material sheet of a protective layer comprising a thermoplastic resin blended with fibers in a range of not less than 40% and not more than 80% in volume content to not less than a melting temperature of the thermoplastic resin;

overlaying said material sheet with a core material sheet comprising a resin foamed article;

providing a surface material on the core material sheet;

and pressuring and shaping said protective layer, said core material sheet, and said surface material which have been overlaid using a molding mold.

* * * * *